United States Patent
Ishihara (10) Patent No.: US 8,368,971 B2
(45) Date of Patent: Feb. 5, 2013

(54) LIGHT SCANNING APPARATUS AND SCANNING DISPLAY APPARATUS

(75) Inventor: Keiichiro Ishihara, Yokohama (JP)

(73) Assignee: Canon Kabushiki Kaisha (JP)

( * ) Notice: Subject to any disclaimer, the term of this patent is extended or adjusted under 35 U.S.C. 154(b) by 772 days.

(21) Appl. No.: 12/171,407

(22) Filed: Jul. 11, 2008

(65) Prior Publication Data

US 2009/0021801 A1 Jan. 22, 2009

(30) Foreign Application Priority Data

Jul. 18, 2007 (JP) .................................. 2007-187113

(51) Int. Cl.
| | |
|---|---|
| *H04N 1/04* | (2006.01) |
| *G06K 9/00* | (2006.01) |
| *G02B 27/22* | (2006.01) |
| *G02B 27/46* | (2006.01) |
| *G02B 26/08* | (2006.01) |
| *G02F 1/33* | (2006.01) |
| *G02B 7/04* | (2006.01) |
| *H01L 27/00* | (2006.01) |

(52) U.S. Cl. ........ 358/475; 382/154; 359/462; 359/559; 359/205.1; 359/305; 359/204.1; 250/208.1; 250/201.2

(58) Field of Classification Search ................ 250/201.2; 359/559, 204; 356/237.3; 347/234
See application file for complete search history.

(56) References Cited

U.S. PATENT DOCUMENTS

| | | | |
|---|---|---|---|
| 6,367,935 B1 | 4/2002 | Wang et al. | |
| 6,649,893 B2* | 11/2003 | Fujimoto et al. | ........... 250/201.2 |
| 6,945,652 B2 | 9/2005 | Sakata et al. | |
| 7,843,636 B2* | 11/2010 | Iwamoto et al. | .............. 359/462 |
| 2006/0033009 A1* | 2/2006 | Kobayashi et al. | ......... 250/208.1 |
| 2008/0218827 A1* | 9/2008 | Watanabe et al. | .............. 359/204 |

FOREIGN PATENT DOCUMENTS

| | | |
|---|---|---|
| JP | 2001-509911 A | 7/2001 |
| JP | 2003-021800 A | 1/2003 |
| JP | 2005-084117 A | 3/2005 |
| JP | 2006-053495 A | 2/2006 |

* cited by examiner

*Primary Examiner* — Charlotte M Baker
*Assistant Examiner* — Rury Grisham
(74) *Attorney, Agent, or Firm* — Rossi, Kimms & McDowell LLP (57) ABSTRACT

A light scanning apparatus includes a scanner 104 which scans a coherent light beam from a light source 101, a light beam component generator 110 which divides the coherent light beam outgoing from the scanner 104 into a plurality of light beam components, and an optical system 105 which collects the plurality of light beam components so that they are incident on a scan surface 106 at an incident angle different from each other, and superposes the light beam components at an identical position on the scan surface.

9 Claims, 9 Drawing Sheets

LIGHT SCANNING APPARATUS AND SCANNING DISPLAY APPARATUS

BACKGROUND OF THE INVENTION

The present invention relates to a light scanning apparatus which scans a light beam having coherence on a scan surface, and furthermore to a scanning display apparatus which forms an image on the scan surface by light beam scanning.

A variety of scanning display apparatuses have been suggested in which images are projected on a screen by scanning a light beam having coherence such as laser beams.

Japanese Patent Laid-Open No. 2003-021800 discloses an example of a laser scanning display which displays a color image on a screen by scanning laser beams of three colors that are red, green, and blue in a two-dimensional direction by using a deflector. The laser light source is suitable as a light source of the scanning display apparatus due to the height and directivity of the output. However, since the coherence is high in the laser light source, a speckle noise (granular interference pattern) that is specific to the laser appears in images, and the sharpness of the image deteriorates.

As a technique for reducing the speckle noise, Japanese Patent Laid-Open No. 2005-084117 discloses a method in which a movable diffuser is arranged between a light scanning device and a projection lens, and time phase modulation is given to scanning light which passes the diffuser. In this method, the phase is modulated in each frame, and a different speckle pattern corresponding to the phase modulation is generated and superposed in the temporal resolution of the eye to reduce speckle contrast.

Japanese translation of PCT International Application No. 2001-509911 discloses another method for reducing the speckle noise. Specifically, it discloses a method in which a laser beam from a light source is divided into a plurality of partial beams by using a phase hologram, and the plurality of partial beams are moved in one pixel to generate a different speckle pattern so that the speckle pattern is averaged in time and space.

However, according to the method of reducing speckle disclosed in Japanese Patent Laid-Open No. 2005-084117, when the frame rate is set at 60 (Hz) and the temporal resolution of the eye is set at 1/30 (sec), there are two kinds of speckle patterns which occur in the temporal resolution of the eye. In this case, the speckle contrast only decreases to about 71%, and the speckle reduction effect is low.

In the scanning display apparatus, two dimensional scanning of an imaged beam spot is performed on a screen. However, only one beam spot is projected on the screen at a certain moment, and the two-dimensional image which is drawn by a beam spot for each moment is recognized due to the afterimage effect of the eyes.

Thus, since the time in which a beam spot exists in a certain pixel position is an instant, even if the diffuser is moved fast, at the point in time when the diffuser has arrived at the position where the phase changes, the beam spot will transfer to another position. In this case, even if the diffuser is moved fast, there is not a substantial speckle reduction effect, and only a speckle reduction effect equal to the phase modulation of each frame is obtained.

Generally, in a scanning display apparatus, the size of one pixel is the same size as the diameter of the beam spot imaged on the screen or a size slightly smaller thereof.

However, according to the method of reducing speckle disclosed in the Japanese translation of PCT International Application No. 2001-509911, the scope which is irradiated by a plurality of mutually parallel partial beams is set as one pixel and the plurality of partial beams is collected with a phase hologram to form a plurality of beam spots in one pixel. When this is replaced with a beam spot diameter equal to one pixel size, the region of one pixel expands, and the resolution deteriorates.

BRIEF SUMMARY OF THE INVENTION

The present invention provides a light scanning apparatus and a scanning display apparatus which can reduce speckle noise effectively without deteriorating the resolution.

A light scanning apparatus as one aspect of the present invention includes a scanner which scans a coherent light beam from a light source, a light beam component generator which divides the coherent light beam outgoing from the scanner into a plurality of light beam components, and an optical system which collects the plurality of light beam components so that they are incident on a scan surface at an incident angle different from each other, and superposes the light beam components at an identical position on the scan surface.

A light scanning apparatus as another aspect of the present invention includes a scanner which scans a coherent light beam from a light source, a light beam component generator which divides the coherent light beam outgoing from the scanner into a plurality of light beam components having light amount distributions, each of which contains a peak, and an optical system which collects the plurality of light beam components so that they are incident on the scan surface at an incident angle different from each other, and superposes the light beam components at an identical position on the scan surface.

A scanning display apparatus as another aspect of the present invention includes the light scanning apparatus described above. The scanning display apparatus forms an image on a scan surface using the light scanning apparatus.

Other aspects of the present invention will become apparent from the following description and the attached drawings.

DETAILED DESCRIPTION OF THE EMBODIMENTS

Exemplary embodiments of the present invention will hereinafter be described with reference to the accompanying drawings.

[Embodiment 1]

Figure 1:
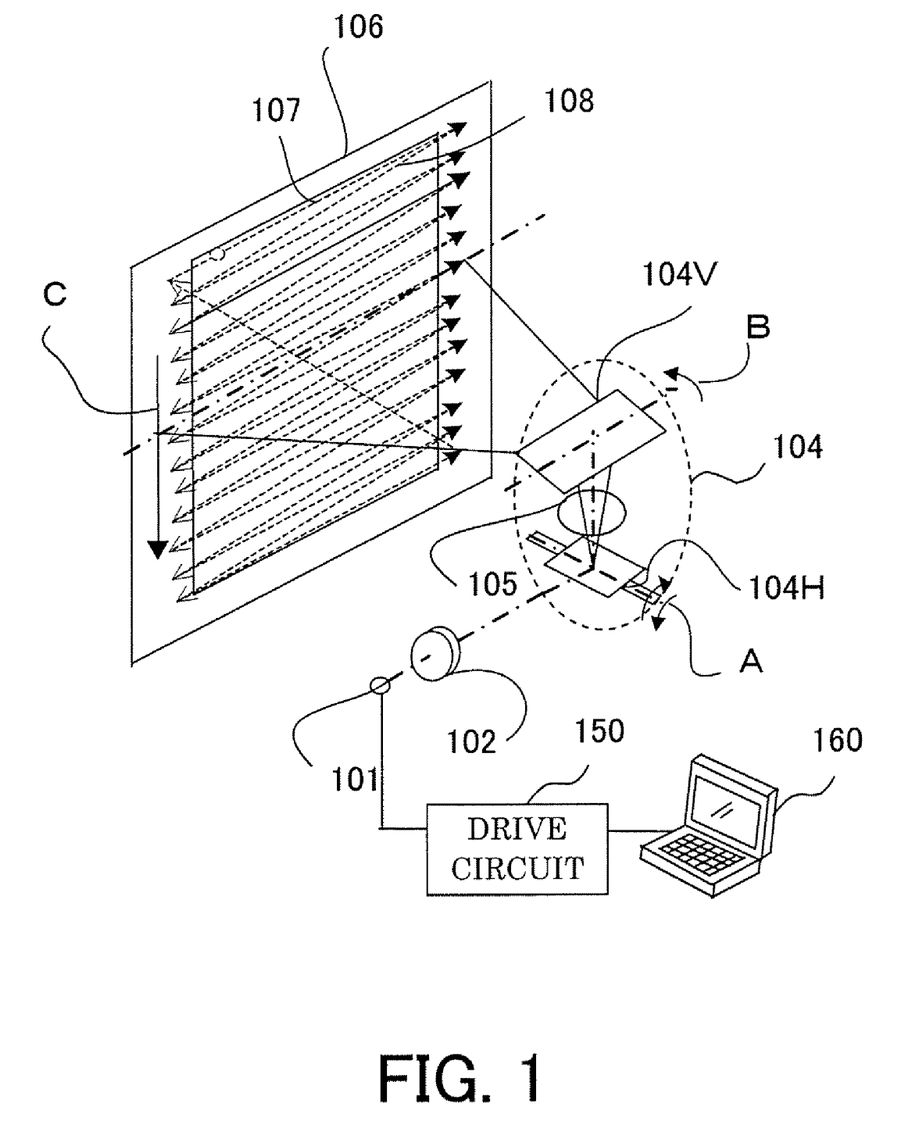
FIG. 1 is a schematic view showing the configuration of a light scanning apparatus and a scanning display apparatus which are embodiment 1 of the present invention.

FIG. 1 schematically shows a configuration of a light scanning apparatus and a scanning display apparatus comprising the light scanning apparatus which are embodiment 1 of the present invention.

Reference numeral 101 denotes a laser light source, and 150 denotes a drive circuit driving the laser light source. The drive circuit 150 inputs image information from an image supply apparatus 160, such as personal computers, DVD players, and TV tuners. The drive circuit 150 modulation drives the laser light source 101 in accordance with the inputted image information. This is similar in the embodiment to be mentioned later.

The emitted coherent laser light beam (laser light beam having coherence) from the laser light source 101 is a divergent light beam, and the divergent light beam is converted into a collimated light beam by a collimator lens 102. It is desirable for the light beam emitting from the laser light source to be a light beam with high coherence (coherent light beam), but as long as it is coherent it will be sufficient. The light beam emitted from the collimator lens 102 is scanned in a two-dimensional direction by a scanning unit 104 (a horizontal scanning device 104H and a vertical scanning device 104V), which is a scanner, and it is imaged on a screen (scan surface) 106 via an image-forming optical system 105. Thereby, an image is projected (displayed or formed) on the screen 106.

In the present embodiment, an MEMS (Micro Electro-Mechanical System) mirror device is used as the horizontal scanning device 104H. The MEMS mirror device can swing (vibrate) the mirror section with a high resonant frequency. Further, the size of the mirror section is small at, for example, 1.5×1.3 mm. On the other hand, a galvanometer mirror is used as the vertical scanning device 104V.

In FIG. 1, arrow A shows the swinging direction of the mirror section of the horizontal scanning device 104H, and arrow B shows the rotatory direction of the vertical scanning device 104V. Reciprocating scanning is performed in the horizontal direction of the light beam by swinging the mirror section of the horizontal scanning device 104H in the direction of arrow A. A light beam is scanned on the screen 106 in the direction of arrow C (vertical direction) by rotating the vertical scanning device 104V in the direction of arrow B.

Therefore, scanning lines 107, 108 reciprocating in a horizontal direction are formed on the screen 106 from the top of the image sequentially downward and when they have reached the bottom of the image they return to the top of the image again. One frame image is formed on the screen 106 by this consecutive movement. An moving image is then displayed by performing this movement repeatedly. Actually, there is only one light beam spot on the screen 106 in a certain moment. However, since a spot is scanned two-dimensionally, an image is recognized due to the afterimage effect of the eyes of the observer.

In the present embodiment, the horizontal scanning device 104H is driven at a resonance frequency of 18 kHz and the vertical scanning device 104V is driven at 60 Hz. Thereby, 300 horizontal scanning lines are formed on the way out and on the way back, and SVGA images of 800 pixels in the horizontal direction and 600 pixels in the vertical direction are projected on the screen 106.

FIG. 1 schematically show scanning lines 107 and 108. However, the resolution actually displays an SVGA image at a 12-inch opposite angle size. The size of one pixel is about 300 μm.

Further, a two-dimensional MEMS mirror device capable of two-dimensional scanning of a light beam may be used as a scanner.

Figure 2:
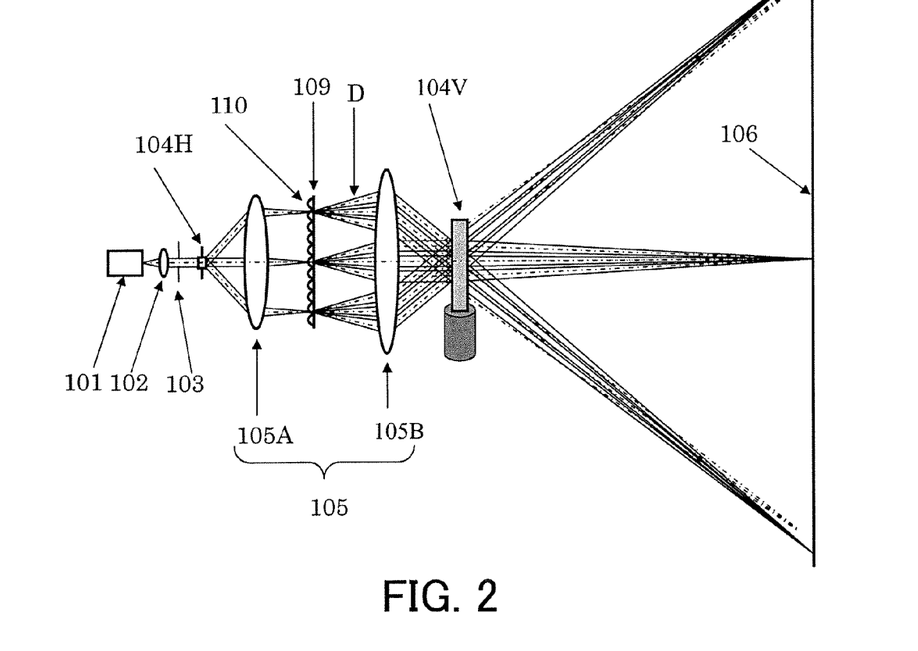
FIG. 2 is a horizontal cross-sectional view of the apparatus of embodiment 1.

FIG. 2 shows a horizontal section of the light scanning apparatus.

The divergent light beam emitted from the laser light source 101 is converted into a collimated light beam by the collimator lens 102 and the width of the light beam is limited by an aperture stop 103 and enters the horizontal scanning device 104H.

The deflected light beam deflected in the horizontal direction by the horizontal scanning device 104H is imaged on the screen 106 as a spot by the image-forming optical system 105 which is constituted by a scanning optical system (an optical system at the upstream side of a microlens array 110) 105A and a projection optical system (an optical system at the downstream side of the microlens array 110) 105B. The scanning optical system 105A forms an intermediate image-forming plane 109 in light beam deflected by the horizontal scanning device 104H.

The microlens array 110, which is a light beam component generator, is positioned so that it overlaps the spot formed on the intermediate image-forming plane 109. The microlens array 110 generates a plurality of diffracted light beam components (hereinafter referred to as diffracted light beam) D as plural light beam components from one light beam which has entered. The plurality of diffracted light beams D are collected to one point on the screen 106 by the projection optical system 105B and are re-imaged as a spot.

In other words, condensing light to one point on the screen 106 is synonymous with it being superposed in an identical position on the screen 106. One point and the identical position are equivalent to one pixel.

The image-forming optical system 105 forms a conjugate point of the horizontal scanning device 104H between the intermediate image-forming plane 109 and the screen 106. The vertical scanning device 104V is positioned in the conjugate point or the vicinity thereof, and light beam from the laser light source 101 is scanned in the vertical direction.

Figure 3A:
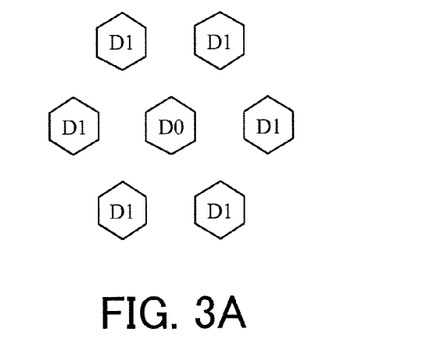
FIG. 3A is a diagram showing the structure of a microlens array used in the apparatus of embodiment 1.
Figure 3B:
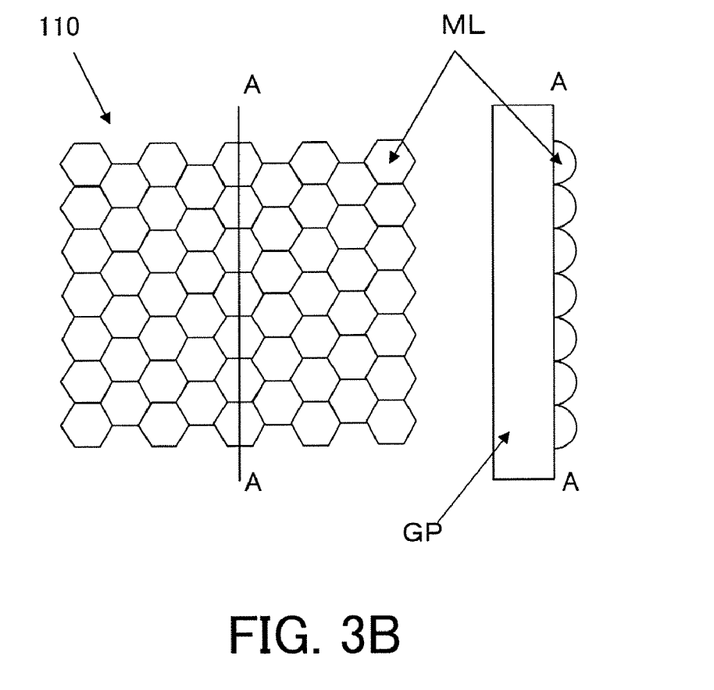
FIG. 3B is a diagram showing a distribution pattern of diffracted light beam from a microlens array in embodiment 1.

FIG. 3B shows an example of the shape of a microlens array (a light beam component generator) 110 and FIG. 3A shows an example of the distribution of a plurality of diffracted light beams generating from one light beam by the microlens array 110. The microlens array (the light beam component generator) 110 divides (converts) a light beam which is incident on the microlens array 110 into a plurality of light beam components (light beams).

As shown on the left side of FIG. 3B, an equilateral hexagon shaped microlens ML is installed adjacent to the microlens array 110 at a 10 μm pitch. Specifically, the microlens ML is positioned so that six microlenses surrounding one microlens. In other words, it is positioned so that lines linking the center of the microlens around the circumference form a hexagon. Hereinafter this placement will be referred to as a hexagon placement. The microlens array 110 functions as a diffractive grating which generates a plurality of diffracted light beams from one light beam which has entered by being inserted in the light path.

In the right side of FIG. 3B, the shape of the section (the cross section at the A-A line on the left side of the diagram) of the microlens array 110 is shown. The microlens array 110 is configured by a micro lens ML having a thickness of tens of micrometers being formed on a 1 mm thick glass substrate GP. High diffraction efficiency is acquired by optimizing the curvature of the microlens ML.

Since the microlens ML in the microlens array 110 is arranged as a hexagon, as shown in FIG. 3A, the distribution (far field pattern) of the diffracted light beams generated from one light beam by the microlens array 110 becomes a pattern based on the hexagon.

There is a zeroth-order diffracted light beam D0 in the center of the distribution of the diffracted light beams, and there are six (6) first-order diffracted light beams D1 at the circumference. Each diffracted light beam is basically diffracted with the same light amount ratio. In addition, each diffracted light beam is separated from the others. Although it is not shown in the diagram, there is a high order diffracted light beam such as a second-order diffracted light beam on the outside of the first-order diffracted light beams D1. All of the first-order diffracted light beams described above are preferably separated from each other, but are not limited to that. For example, two first-order diffracted light beams among the first-order diffracted light beams can be superposed over each other, whereas other two first-order diffracted light beams are separated from each other.

In the present embodiment, the zeroth-order diffracted light beam D0 and the first-order diffracted light beams D1 generated in the microlens array 110 are collected to one point on the screen 106 as a plurality of light beam components.

Figure 13:
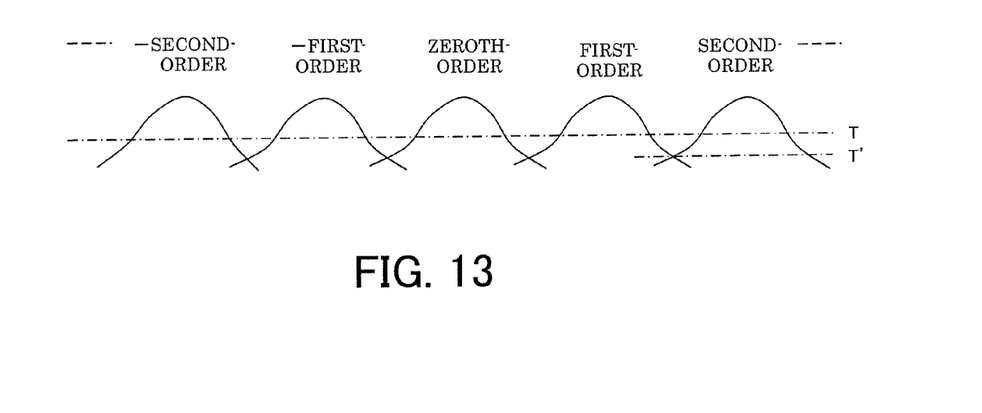
FIG. 13 is a schematic diagram showing the light amount distribution of a plurality of light beam components in the embodiments.

"The plurality of light beam components (diffracted light beam)" has a light amount distribution (intensity distribution), which includes a peak for each light beam component, as shown in FIG. 13. In addition, in FIG. 13, the second-order diffracted light beam which is not used in the present embodiment is shown. The "plurality of light beam components" are separated from each other in light amount portions which are greater than the specific light amount level T (the light amount level to become $1/e^2$ of the peak light amount). In other words, the light amount portions, which are less than the specific light amount level T, may be overlapped on one another. In the present embodiment, the light amount portions which are greater than the specified light amount level are separated from each other in this manner, and the plurality of light beam components, which are overlapping each other in the region showing the light amount distributions which are less than the specific light amount level, are considered to be separate from each other. Although it will be explained in the following embodiment 3, it can be said that the zeroth-order diffracted light beams and the second-order diffracted light beams in FIG. 13 are separated from each other (the diffraction order may be either the +2 order or the −2 order), and the second-order diffracted light beams themselves are also separated from each other.

However, if the "plurality of light beam components (a plurality of diffraction light beam components in which the order of diffraction is different from each other)" have a light amount distribution including a peak for each light beam component, they do not need to be separated from each other, and may be adjacent to each other (may be overlapped). In FIG. 13, when included up to the light amount portion T', which is slightly lower than the specific light amount level T, the light beam components which are next to each other can also be said to be adjacent. In the following description, a case in which the plurality of light beam components are separated from each other will be explained. However, even when they are adjacent, some speckle reduction effects can be acquired when incident angles to the screen of those light beam components are different.

The meaning of the above "plurality of light beam components" is the same in the other embodiments to be mentioned later.

The laser light source is a green laser with a 532 nm oscillation wavelength. The light beams entering the microlens array 110 with a 10 μm pitch of the microlens ML are diffracted at an angle of 0.00 deg for the zeroth-order diffracted light beam D0 and at an angle of 3.05 deg for the first-order diffracted light beams D1.

The projection optical system 105B, shown in FIG. 2, is the conjugation relationship between the intermediate image-forming plane 109 and the screen 106 and it collects the zeroth-order diffracted light beam D0 and the first-order diffracted light beams D1 so that they face the screen 106 at incident angles which differ from each other. It also collects the zeroth-order diffracted light beam D0 and the first-order diffracted light beams D1 to one point on the screen 106 (it is superposed in an identical position).

The principle of the speckle noise reduction in the light scanning apparatus (or scanning display apparatus) of the present embodiment will now be explained.

As for a normal screen, the surface roughness is sufficiently larger than the wavelength of the laser light beam, and the correlation length of the surface roughness is sufficiently smaller than the irradiation spot diameter. Thereby, the phase of the laser light beam which scatters at each point on the screen is random corresponding to the microscopic asperity of the surface and is distributed equally at intervals (−π, π).

The laser light beam arriving on the screen and then being scattered on the screen overlaps in a random phase relationship on the retina of the eyes of the observer, and produces an irregular granular interference pattern on the retina. This interference pattern is called a speckle.

The speckle intensity is quantified using a speckle contrast C, and it can be defined as $$C = \frac{\sigma I}{\langle I \rangle}$$

from the standard deviation σI and the average value <I> of the speckle intensity I.

In one of the techniques for reducing speckle noise, there is a method for superposing N speckle patterns which have little or no correlation with each other, and smoothing the speckle intensity. At this time, it is known that when N non-correlative speckle patterns are superposed, the speckle contrast C is reduced by $1/\sqrt{N}$ times. To reduce speckle noise with this technique, N speckle patterns which have little or no correlation with each other have to be generated and superposed.

Especially, generating and superposing N non-correlative speckle patterns on each other allows for a maximum speckle-noise reduction effect.

The present embodiment can also reduces speckle noise by generating and superposing a plurality of speckle patterns which differ (little or no correlative) from each other.

Further, in the present embodiment, different degrees of the speckle pattern are expressed with correlation coefficients.

The correlation coefficient r of brightness $X_1$ and $X_2$ of two speckle patterns is defined as $$r = \frac{\sum (X_1 - \langle X_1 \rangle)(X_2 - \langle X_2 \rangle)}{\sqrt{\sum (X_1 - \langle X_1 \rangle)^2} \sqrt{\sum (X_2 - \langle X_2 \rangle)^2}}$$

by using the speckle intensity average values $\langle X_1 \rangle$ and $\langle X_2 \rangle$.

Figure 4:
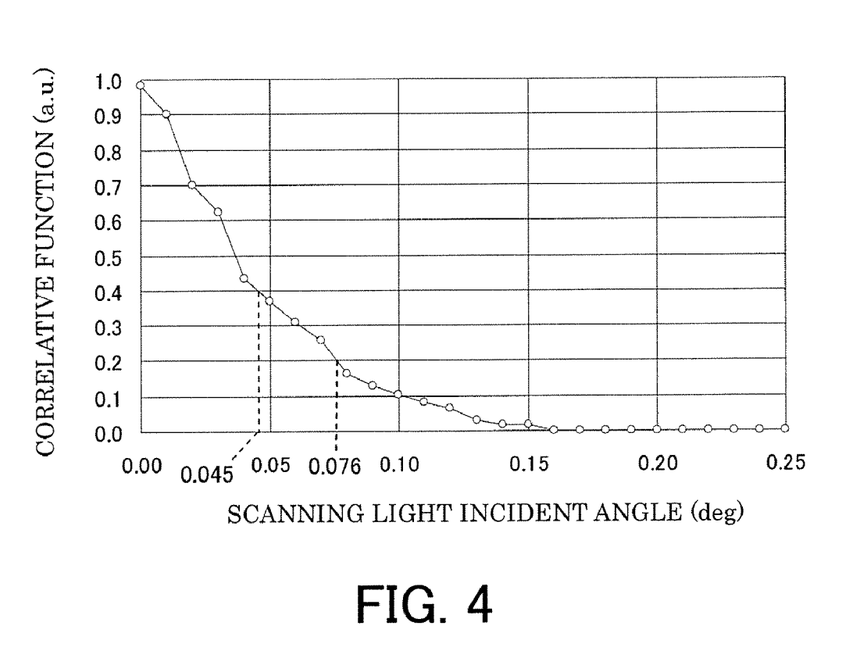
FIG. 4 is a diagram showing the relationship between a correlation of the speckle patterns and the incident angle.

FIG. 4 shows the angular dependency in the pattern correlation of the speckle pattern.

This graph is the result of an experiment calculating the angular dependency of the speckle pattern. The incidence angle (deg) for the screen is taken in the horizontal axis and the correlation coefficient (a.u.) of the speckle pattern is taken in the vertical axis.

In this experiment, one beam which was generated from the laser light source 101 is two-dimensionally scanned as shown in FIG. 2, and a uniform image is displayed on the screen 106 via the image-forming optical system 105, then a speckle pattern is acquired by picking up an image near the center of the image using a CCD camera.

And, the reference incident angle is set at the angle at which a scanned light beam enters the screen 106, and the correlation with the speckle pattern in the reference incident angle is taken by picking up an image of the speckle pattern which occurs when the incidence angle is altered little by little.

As shown in FIG. 4, when the incidence angle was altered from the reference incident angle, the correlation coefficient decreased gradually, and the correlation coefficient dropped below 0.4 at the point in time when the incidence angle was altered 0.05 deg. The correlation coefficient dropped below 0.2 at a point in time when the incident angle had been altered 0.08 deg and became approximately 0.0 afterwards.

It can be determined that there is a strong correlation when the correlation coefficient r is between 1.0 and 0.7, there is a considerable correlation when r is between 0.7 and 0.4, there is little correlation (low correlative) when r is between 0.4 and 0.2, and there is very little correlation when r is 0.2 or less. In the graph in FIG. 4, the incidence angle which becomes the correlation coefficient r of 0.4 is 0.045 deg and the incidence angle which becomes r of 0.2 is 0.076 deg.

As a result, when the inclination angle is too small with respect to the reference incident angle, the speckle pattern which occurs shows that there it has a correlation with the speckle pattern which occurs at the reference incident angle, and a speckle contrast reduction effect is not sufficiently acquired even if these are superposed.

Therefore, in the present embodiment, another light beam component, which arrives at a position identical to the position where the reference light beam component having the reference incident angle arrives at the screen 106, is generated. And, sufficiently inclining the incident angle of the other light beam component with respect to the incident angle of the reference light beam component reduces the speckle pattern correlation which occurs due to each light beam component.

The correlation coefficient r of the speckle pattern correlation is preferably 0.4 or less.

More preferably, the correlation coefficient r is 0.2 or less. Thereby, the angle (separation angle θd), which inclines the other light beam component with respect to the incident angle of the reference light beam component, is preferably 0.045 deg or greater, and more preferably it is 0.076 deg or greater.

In other words, $$\theta d \geq 0.045 \text{ deg} \quad (1)$$

and more preferably $$\theta d \geq 0.076 \text{ deg} \quad (2)$$

are satisfied.

In the present embodiment, the plurality of light beam components which separate from each other by the microlens array 110, which is a diffractive grating, and advance, is generated from one light beam emitted from the laser light source 101, and then these light beam components are re-imaged in one point on the screen 106 (they superpose at identical positions). The plurality of light beam components advance while maintaining sufficient separation angles from each other on the screen 106, and collects in one point on the screen 106.

Thereby, speckle pattern correlations generated by the plurality of light beam components entering identical positions on the screen 106 are decreased, and speckle contrast due to the superposing of speckle patterns with little correlation can be decreased effectively.

Figure 5A:
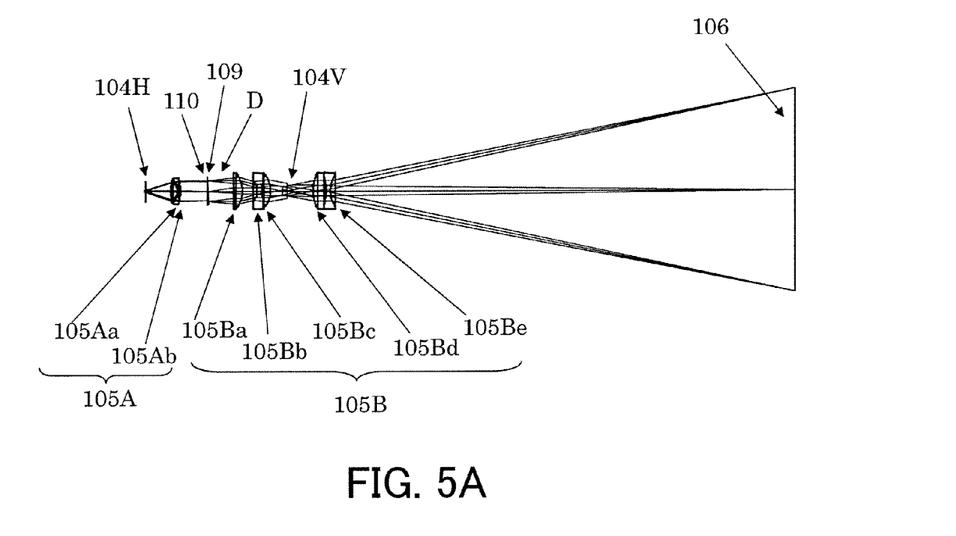
FIG. 5A is a horizontal cross-sectional view of the image-forming optical system in the apparatus of embodiment 1.
Figure 5B:
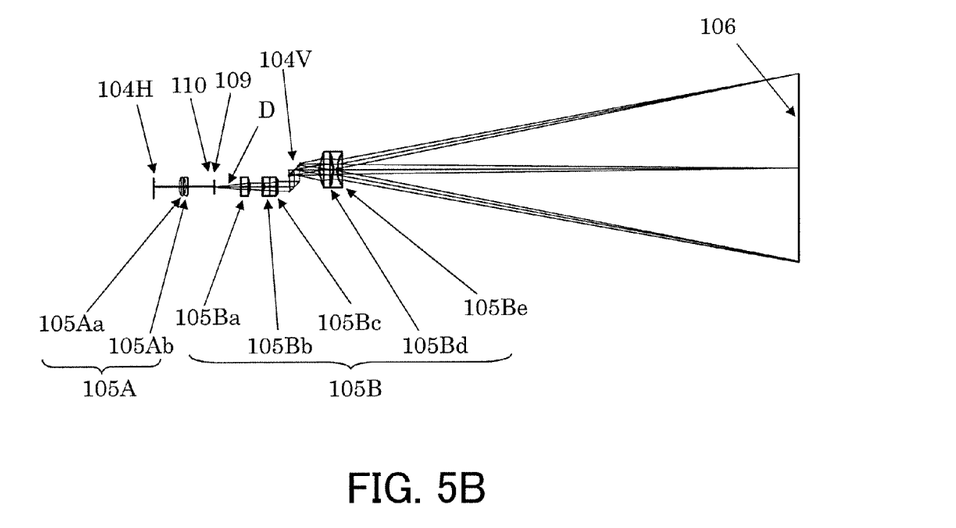
FIG. 5B is a vertical cross-sectional view of the image-forming optical system in the apparatus of embodiment 1.

FIG. 5A and FIG. 5B specifically show the image-forming optical system 105 in a horizontal cross-sectional view and a vertical cross-sectional view of the light scanning apparatus of the present embodiment, respectively. Table 1 shows a configuration (numerical example) of the image-forming optical system 105.

The scanning optical system 105A includes two lenses 105Aa and 105Ab, and images the deflected light beam from the horizontal scanning device 104H on the intermediate image-forming plane 109.

The microlens array 110 is arranged on the intermediate image-forming plane 109, and a plurality of diffracted light beams D, which separate each other, is generated from one light beam which scans over the microlens array 110 with the scanning optical system 105A.

The projection optical system 105B includes five lenses 105Ba, 105Bb, 105Bc, 105Bd, and 105Be, and collects a plurality of diffracted light beams D from the microlens array 110 to one point on the screen 106 as a spot.

The vertical scanning device 104V is positioned at the conjugate point of the horizontal scanning device 104H formed by three lenses 105Ba, 105Bb, and 105Bc of the intermediate image-forming plane 109 side in the projection optical system 105B or the vicinity thereof. The vertical scanning device 104V scans the vertical direction of a spot scanned in a horizontal direction by the horizontal scanning device 104H, and displays a two-dimensional image on the screen 106.

In the microlens array 110, a zeroth-order diffracted light beam D0 is diffracted at an angle of 0.00 deg, and a first-order diffracted light beam D1 is diffracted at an angle of 3.05 deg. The projection optical system 105B has a conjugate relationship with the intermediate image-forming plane 109 and the screen 106, and the lateral magnification is 9.6 times. Therefore, the first-order diffracted light beam D1 makes an angle θi of 0.32 deg with respect to the zeroth-order diffracted light beam D0 and enters the screen 106.

Figure 6:
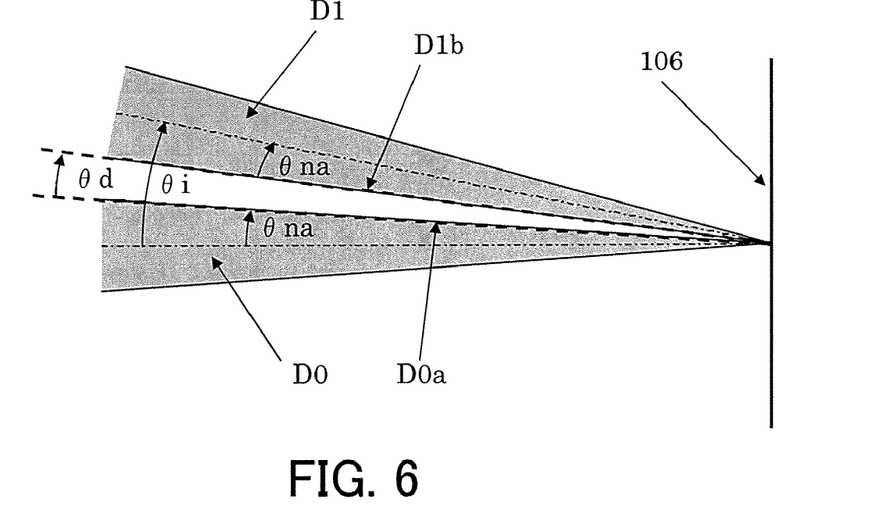
FIG. 6 is an illustration of the light beam component entering the screen in embodiment 1.

FIG. 6 shows a diffracted light beam entering the screen 106. In this diagram, the state in which two diffracted light beams from among the plurality of diffracted light beams separated from each other, which are generated by the microlens array 110, are collected to one point on the screen 106 again, is shown schematically.

In the diagram, reference numeral D0 denotes the zeroth-order diffracted light beam as the reference light beam component, and D1 denotes the first-order diffracted light beam. These separate at a separation angle θd between marginal light rays D0a and D1b, which face each other, and enter the screen 106.

In order to acquire a speckle pattern with almost no correlation, it is important to separate the plurality of diffracted light beams generated by a microlens array 110 at a separation angle of 0.076 deg (or 0.045 deg) or more, and enter the light beams onto a screen 106.

According to the present embodiment, a marginal light ray D0a at an upper side of the zeroth-order diffracted light beam D0 and a marginal light ray D1b at a lower side of the first-order diffracted light beam D1 are separated at a separation angle θd of 0.076 deg or more. Thus, the first-order diffracted light beam D1 is entered onto the screen 106 so as to be at the angle of θi=0.32 deg with respect to the zeroth-order diffracted light beam D0.

In the present embodiment, the spot diameter W is 300 μm and the wavelength λ is 532 nm. A numeral aperture NA of the light beam entering the screen 106 is expressed by the following formula.

$$NA = \sin\left(\frac{k\lambda}{2W}\right)$$

Here, k=1.64 and NA=0.00145.

The half-convergence angle θna of incident light beam to the screen 106 is expressed in the following formula.

$$\theta na = NA \times \frac{180}{\pi}$$

Since NA is 0.00145, and the half-convergence angle θna of incident light beam to the screen 106 is 0.0833 deg.

The separation angle θd between the marginal light ray D0a at an upper side of the zeroth-order diffracted light beam D0 and the marginal light ray D1b at the lower side of the first-order diffracted light beam D1 when entering into the screen 106 is expressed in the following formula.

$$\theta d = \theta i - 2 \times \theta na$$

Therefore, the separation angle θd between the marginal light ray D0a at an upper side of the zeroth-order diffracted light beam D0 and the marginal light ray D1b at a lower side of the first-order diffracted light beam D1 when entering the screen 106 becomes 0.151 deg, meeting the aforementioned requirements of (1) and (2).

In this way, the plurality of diffracted light beams (light beam components) generated by the microlens array 110 are sufficiently separated and entered into the screen 106 at an incident angle different from each other. The speckle patterns generated by each of the diffracted light beams can be accordingly made into patterns with low correlation. At this time, the first-order diffracted light beam D1 is separated from the adjacent first-order diffracted light beam illustrated in FIG. 3A at an incident angle of 0.151 deg. Therefore, the total of 7 light beams including 1 zeroth-order diffracted light beam D0 and 6 first-order diffracted light beams D1 are separated from one another at sufficiently large separation angles, and then proceed to the screen 106 and collect to one point on the screen 106.

The speckle contrast of an image drawn when the above described 7 diffracted light beams are collected to one point on the screen 106 and scanned is C=0.09.

Meanwhile, a conventional light scanning apparatus (or a scanning display apparatus) scanned over the screen with one light beam. In order to display an image under conditions similar to a conventional apparatus, the microlens array 110 is removed from the light scanning apparatus of the present embodiment, and one light beam is scanned. The speckle contrast of the image drawn at this time is C=0.24. It should be noted that the spot diameters imaged on the screen are about 300 μm in both cases, and the resolution rarely changed.

The speckle reduction effect is indicated by the reduction of the speckle contrast in the image of the present embodiment in comparison with a conventional image. The speckle reduction effect is expressed with a reduction rate calculated from the speckle contrast ratio.

The speckle contrast can be reduced by 0.375 times to from C=0.24 to C=0.09 by entering the 7 diffracted light beams generated by the microlens array 110 while maintaining sufficiently large separation angles to one another.

Since the speckle contrast C is reduced by $1/\sqrt{N}$ times when N speckle patterns with no correlation are superposed as described above, $1/\sqrt{7}=0.378$ when N=7 is substituted into $1/\sqrt{N}$, and this nearly corresponds to the speckle reduction effect of 0.375 times of the present embodiment.

Accordingly, the speckle patterns generated by the 7 diffracted light beams in the present embodiment can be said to be patterns with almost no correlation to one another. In this way, excellent speckle reduction effects can be acquired by the configuration in which 7 diffracted light beams, which, by the microlens array 110, proceed toward the screen 106 at sufficiently separate angles and are collected to one point on the screen 106, are generated.

As described above, according to the present embodiment, the microlens array 110 as a light beam component generator generates a plurality of light beam components from the light beam of the light source 101 which separate from one another. Then, the plurality of light beams proceed toward the screen 106 at incident angles different from one another and collect so that they are superposed in one point (identical position) on the screen 106. Thereby, the correlation of the speckle patters generated by each of the light beam components can be reduced, and the speckle contrast of the superposed speckle patterns can be effectively reduced.

Since a spot diameter formed on the screen 106 rarely changes even if the plurality of light beam components which separate from one another are generated, the speckle contrast can be reduced without deteriorating the resolution.

[Embodiment 2]

The configuration explained with above embodiment 1 (and illustrated by other embodiments to be mentioned later) can be applied when using a light source which emits the three colors of RGB. In other words, a light scanning apparatus and a scanning display apparatus which project a color image can be configured by applying the configuration shown in embodiment 1.

Figure 7:
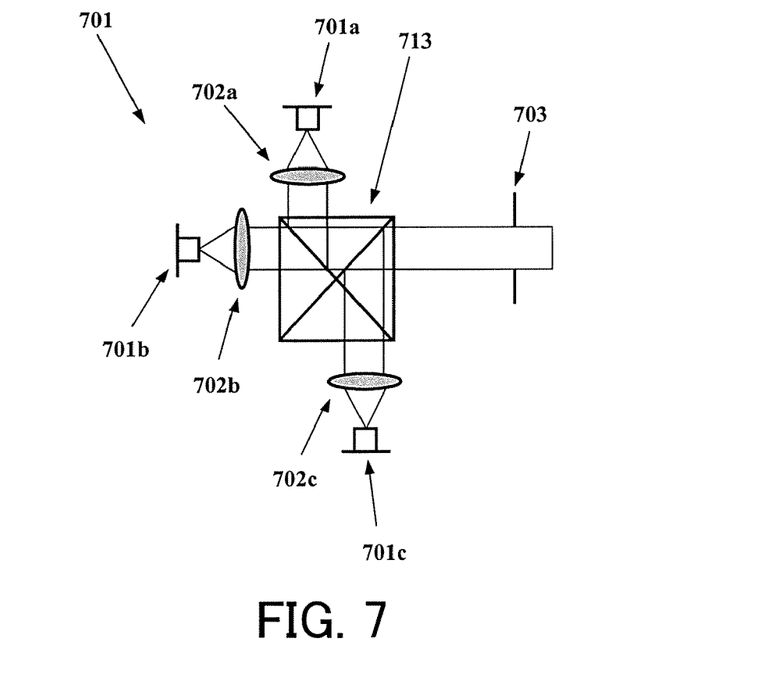
FIG. 7 is a diagram showing the configuration of a color light source unit used in the light scanning apparatus and the scanning display apparatus which are embodiment 2 of the present invention.

FIG. 7 shows an example of a color light source unit used in the apparatus of the present embodiment. A color light source unit 701, for example includes three laser light sources which are a red semiconductor laser 701a with an emission wavelength of 640 nm, a green laser light source 701b with an emission wavelength of 532 nm, and blue semiconductor laser 701c with an emission wavelength of 440 nm. Further, the SHG light source which generates a green laser due to a wavelength conversion from an infrared laser may be used as the green laser light source 701b.

Light beams emitted from laser light sources 701a, 701b, and 701c are synthesized into one beam by a dichroic prism 713 after being converted into collimated light beams by the corresponding collimator lenses 702a, 702b, and 702c. Then, the width of the light beam is limited with an aperture stop 703 and then scanned by the scanning unit explained in embodiment 1, and then is projected on the screen.

In such a light scanning apparatus, the diffraction angle at the microlens array 110 explained in embodiment 1 which becomes the biggest is the red light beam and the one which becomes the smallest is the blue light beam. The spectral luminous efficiency of each of the wavelengths is about 0.2 at a wavelength of 640 nm, about 0.9 at a wavelength of 532 nm, and about 0.02 at a wavelength of 440 nm. Thus, the spectral luminous efficiency of the blue is extremely low, and the speckle is also hardly visible to observers. Therefore, in the green and red light beams, conditions (1) and (2) regarding the separation angle explained in embodiment 1 are preferably satisfied. And more particularly, since the spectral luminous efficiency is high in the green, and the speckle tends to stand out, the microlens array 110 may be optimized in green. Thereby, even in a light scanning apparatus and a scanning display apparatus for color images utilizing a three-color laser light source, good images with reduced speckle can be displayed.

[Embodiment 3]

Figure 8:
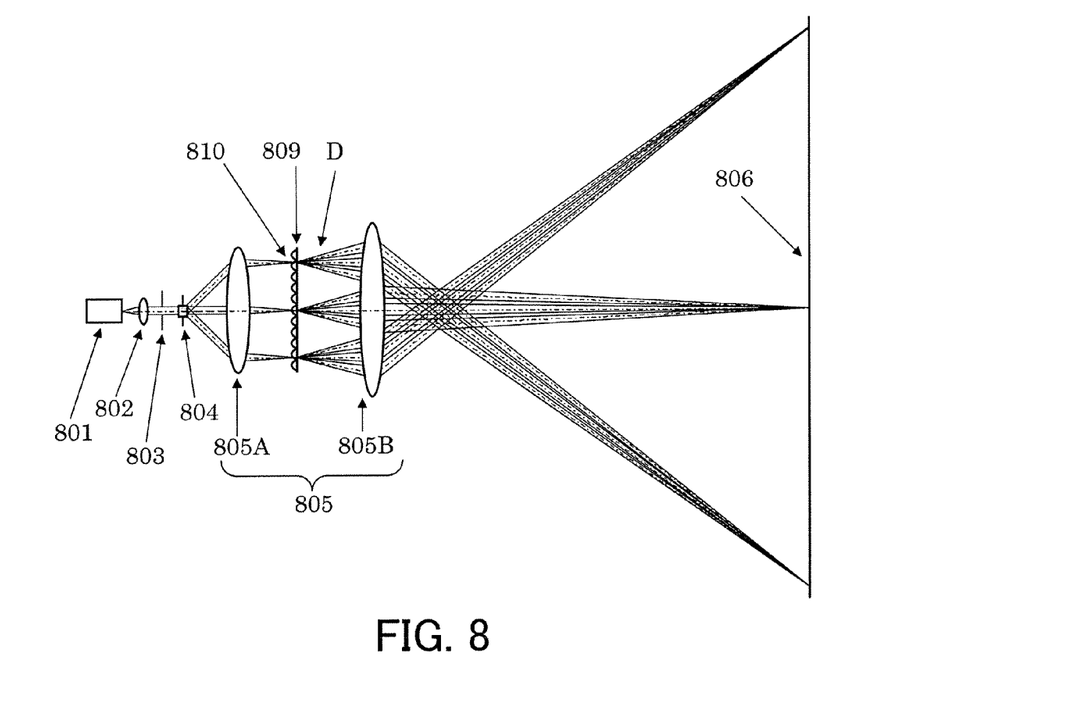
FIG. 8 is a horizontal cross-sectional view of the light scanning apparatus and the scanning display apparatus which are embodiment 3 of the present invention.

FIG. 8 shows a horizontal section of the light scanning apparatus (and the scanning display apparatus) which is embodiment 3 of the present invention.

The present embodiment differs from embodiment 1 in that the two-dimensional scanning device capable of scanning a light beam two dimensionally with one is used as a scanner, and the pitch of the microlens in the microlens array as the light beam component generator is set at 20 µm.

The coherent light beam (laser light beam or divergent light beam) emitted from a laser light source 801 is converted into a collimated light beam by the collimator lens 802 and then the width of the light beam is limited by aperture stop 803, and then it enters a two-dimensional scanning device 804.

The deflected light beam deflected in the horizontal direction and the vertical direction by the two-dimensional scanning device 804 is imaged on the screen 806 as a spot by an image-forming optical system 805 configured from a scanning optical system 805A and a projection optical system 805B.

The scanning optical system 805A forms an intermediate image-forming plane 809 by imaging the light beam deflected in a horizontal direction and a vertical direction once with the two-dimensional scanning device 804. A microlens array 810, as the light beam component generator, is positioned so as to overlap the spot formed on the intermediate image-forming plane 809.

The microlens array 810 generates a plurality of diffraction light beams (light beam components) D from one light beam which has entered. The projection optical system 805B collects the plurality of diffraction light beams D to one point on the screen 806, in other words, it forms a spot by superposing the light beams in an identical position on the screen 806. By such a configuration, light beams from laser light source 801 are scanned two-dimensionally and a two-dimensional image is projected (indicated or formed) on the screen 806.

The microlens array 810 of the present embodiment is formed with the microlens positioned in hexagon as shown in FIG. 3B, however the pitch of the microlens is 20 µm which is double that of embodiment 1, and it narrows the angle which generates the diffracted light beam more than that of embodiment 1. Thereby, in addition to the zeroth-order diffracted light beam and first-order diffracted light beam, the first-order diffracted light beam generating between the second-order diffracted light beams and the second-order diffracted light beam can be used even if it is the same numerical aperture NA as embodiment 1. Thereby, the light amount arriving at screen 806 can be increased.

Figure 9:
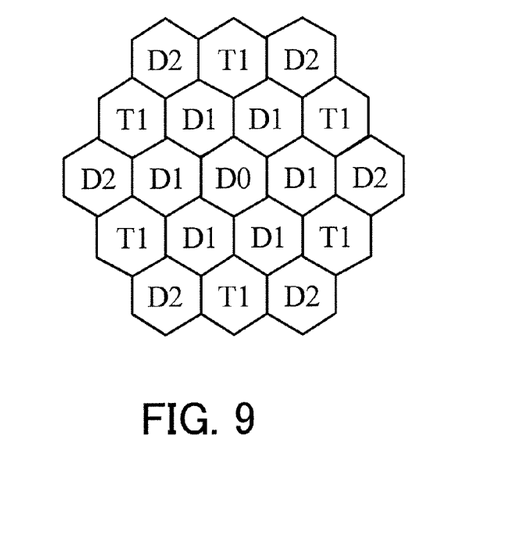
FIG. 9 is a diagram showing a distribution pattern of the diffracted light beam from a microlens array in embodiment 2.

FIG. 9 shows a distribution of diffracted light beams generating in the microlens array 810 in the present embodiment.

In the center of the distribution of the diffracted light beams, there is one zeroth-order diffracted light beam D0, and there are six first-order diffracted light beams D1 at the circumference. Furthermore, there are six second-order diffracted light beams D2 on the outside. In addition, between the second-order diffracted light beams D2 adjacent each other, there is a first-order diffracted light beam (hereinafter referred to as the first-order diffracted light beam of the opposite angle direction) T1.

Although it will be mentioned in detail later, in the present embodiment, a portion of the first-order diffracted light beam D1 is overlapped with respect to the zeroth-order diffracted light beam D0. Meanwhile, second-order diffracted light beams D2 are separate from the zeroth-order diffracted light beams D0. Although there is a high order diffracted light beam such as a third-order diffracted light beam on the outside of the second-order diffracted light beam D2 and the first-order diffracted light beam T1 of the opposite angle direction, it is not shown in the diagram.

In the present embodiment, the zeroth-order diffracted light beam D0, the second-order diffracted light beam D2, and the first-order diffracted light beam T1 of the opposite angle direction generated in the microlens array 810 are collected to one point on the screen 806 by the projection optical system 805B as a plurality of light beam components. In other words, the present embodiment uses diffracted light beam components of a portion of diffraction orders from among the diffracted light beam components of a plurality of diffraction orders generating in the microlens array 810, as the diffractive grating, in order to reduce speckle. Six first-order diffracted light beams D1 enter the screen 806, however they correspond to "other light beam components" which are not used for speckle reduction.

The laser light source uses a green laser light beam with a wavelength of 532 nm. As for the diffraction angle of each order, the zeroth-order diffracted light beam D0 is 0.00 deg, the first-order diffracted light beam D1 is 1.52 deg, the second-order diffracted light beam D2 is 3.05 deg, and the first-order diffracted light beam T1 of the opposite angle direction is 2.64 deg. In the present embodiment, the above-described 19 diffracted light beams enter the same aperture as in embodiment 1.

Figure 10:
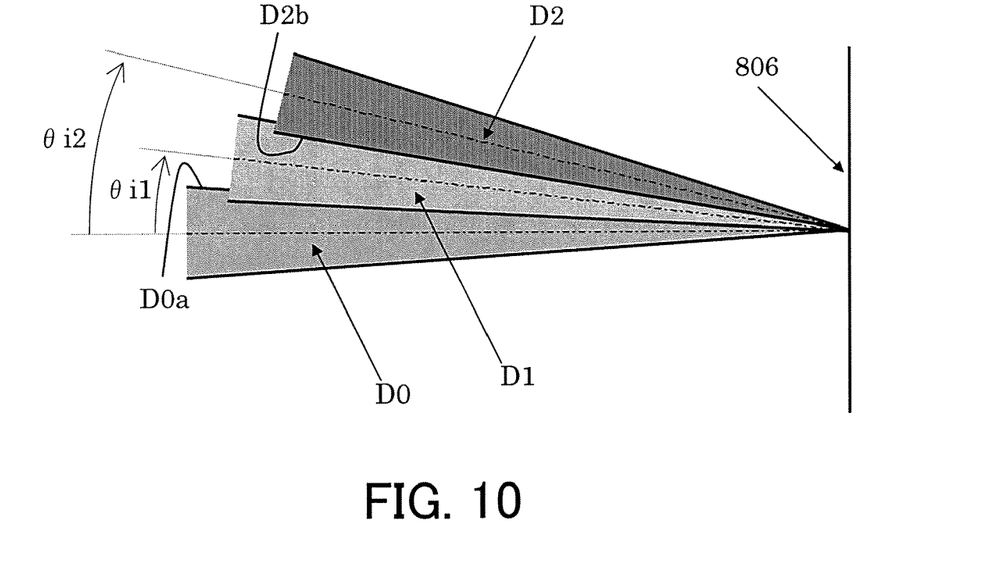
FIG. 10 is an illustration of a light beam component entering the screen in embodiment 2.

FIG. 10 shows the state where the plurality of diffracted light beams enters the screen 806.

When the first-order diffracted light beam D1 enters the screen 806, it makes an angle of $\theta i1=0.16$ deg with respect to the zeroth-order diffracted light beam D0. The second-order diffracted light beam D2 makes an angle of $\theta i2=0.32$ deg with respect to the zeroth-order diffracted light beam D0, and the first-order diffracted light beam T1 of the opposite angle direction makes an angle of 0.28 deg with respect to the zeroth-order diffracted light beam D0.

In the present embodiment, the first-order diffracted light beam D1 is partially superposed with the zeroth-order diffracted light beam D0, and enters the screen 806. Thus, the speckle pattern generated by the first-order diffracted light beam D1 has intermediate correlation with respect to the speckle pattern generated by the zeroth-order diffracted light beam D0. Even in this case there is some speckle reduction effect, however the reduction rate largely decreases in comparison to the speckle reduction effect originally obtained ($1/\sqrt{7}=0.378$) when seven speckle patterns are superposed.

Therefore, in the present embodiment, the speckle reduction effect is improved by effectively using the second-order diffracted light beam D2, which separates at a large angle with respect to the zeroth-order diffracted light beam D0, and the first-order diffracted light beam T1 of the opposite angle direction.

The second-order diffracted light beam D2 makes an angle of $\theta i2=0.32$ deg with respect to the zeroth-order diffracted light beam D0 and enters the screen 806. Like in embodiment 1, the half-convergence angle $\theta$na of incident light beam to the screen 806 of the second-order diffracted light beam D2 (cf. FIG. 6) is equal to 0.0833 deg.

The separation angle $\theta$d between upper marginal ray D0$a$ of the zeroth-order diffracted light beam D0 and the lower marginal ray D2$b$ of the second-order diffracted light beam D2 is 0.151 deg, and satisfies previously mentioned conditions (1) and (2). Thus, the second-order diffracted light beam D2 can generate a speckle pattern with little correlation to the zeroth-order diffracted light beam D0.

The six second-order diffracted light beams D2 are separated from each other at a separation angle of $\theta d=0.151$ deg, and each can generate speckle patterns with little correlation.

Meanwhile, the first-order diffracted light beam T1 of the opposite angle direction is separated at a separation angle of $\theta d=0.108$ deg with respect to the zeroth-order diffracted light beam D0 and the first-order diffracted light beam T1 of the adjacent opposite angle direction is separated at a similar separation angle. Therefore, the first-order diffracted light beam T1 of the opposite angle direction can also generate a pattern with almost no correlation to the zeroth-order diffracted light beam D0.

However, the first-order diffracted light beam T1 of the opposite angle direction generates a speckle pattern which has correlation with the speckle pattern generated by the second-order diffracted light beam D2 without being separated from the second-order diffracted light beam D2. When the second-order diffracted light beam D2 and the first-order diffracted light beam T1 of the opposite angle direction exist at the same time, the first-order diffracted light beam T1 of the opposite angle direction increases the light amount of the speckle pattern which is generated by the second-order diffracted light beam D2 adjacent to it, and increases the influence. In other words, the light amount of the sum of the second-order diffracted light beam D2 and the first-order diffracted light beam T1 of the opposite angle direction contributes to the speckle reduction.

As for the ratio of the light amount (sum) of the diffracted light beam of each order, the zeroth-order diffracted light beam D0 is 3%, the first-order diffracted light beam D1 is 22%, the second-order diffracted light beam D2 is 37%, and the first-order diffracted light beam T1 of the opposite angle direction is 38%. Thus, the second-order diffracted light beam D2 and the first-order diffracted light beam T1 of the opposite angle direction occupy 75% of the sum of the light amount of all the beam components (zeroth to second-order diffracted light beams D0-D2, and T1) entering the screen 806. 78% will be occupied if the light amount of the zeroth-order diffracted light beam D0 is added.

In this manner, a sufficient speckle reduction effect is obtained by the configuration in which the sum of the light amount of the plurality of light beam components (D0, D2, and T1) contributing to speckle reduction occupies half or greater of the sum of the light amount of the plurality of light beam components (D0, D2, and T1) and the other light beam component (D1).

As for the ratio of the light amounts per one diffracted light beam, the zeroth-order diffracted light beam D0 is 3.1%, the first-order diffracted light beam D1 is 3.7%, the second-order diffracted light beam D2 is 6.1%, and the first-order diffracted light beam T1 of the opposite angle direction is 6.7%. This is when the light amount of the zeroth-order diffracted light beam D0 and the first-order diffracted light beam D1 is lower than that of the second-order diffracted light beam D2 and the first-order diffracted light beam T1 of the opposite angle direction.

With respect to the average value of 5.3% of the light amount of these 19 diffracted light beams, the ratio of the second-order diffracted light beam D2 and the first-order diffracted light beam T1 of opposite angle direction is high, and the ratio of the first-order diffracted light beam D1 is low. Thus, the light amount is preferably concentrated in either one or both of the second-order diffracted light beam D2 and the first-order diffracted light beam T1 of the opposite angle direction which separate with respect to the zeroth-order diffracted light beam D0 in this manner.

In this manner, a sufficient speckle reduction effect is provided by a configuration in which light beams (D2 and T1), which are more than half of the plurality of light beam components (D0, D2, and T1) have a light amount which is more than the average light amount of the plurality of light beam components (D0, D2, and T1) and the other light beam component (D1).

The speckle contrast of the image drawn on the screen 806 by scanning in the state where 19 diffracted light beams generated by the microlens array 810 were collected to one point on the screen was C=0.095.

On the other hand, the speckle contrast of the image drawn by one light beam with the microlens array 810 removed was C=0.24.

Therefore, the speckle reduction effect in the present embodiment is 0.396 times. The number of speckle patterns without correlation becomes N=6.4 if reverse calculated from when the speckle contrast is $1/\sqrt{N}$ times.

As mentioned previously, since the second-order diffracted light beam D2 and the first-order diffracted light beam T1 of the opposite angle direction are not sufficiently separated, a speckle pattern with no correlation cannot be generated.

Thus, among the 19 diffracted light beams generated from the microlens array 810, only 7 light beams, one zeroth-order diffracted light beam D0 and six second-order diffracted light beams D2 (or the first-order diffracted light beam T1 of the opposite angle direction), can generate speckle patterns with almost no correlation to each other. And, it may be said that the speckle contrast is reduced to 0.396 times because these seven speckle patterns are superposed.

According to the present embodiment, the plurality of light beam components and the other light beam components separating from each other are generated from the microlens array 810, and even when one portion of these are superposed, a high speckle reduction effect can be obtained by concentrating the light amount in the plurality of light beam components.

A speckle pattern with almost no correlation (or very little) cannot be generated with light beam components which do not have a sufficient separation angle like that of the second-order diffracted light beam D2 and the first-order diffracted light beam T1 of the opposite angle direction. However, the first-order diffracted light beam T1 of the opposite angle direction adds the light amount to the speckle pattern of the second-order diffracted light beam D2 adjacent to it, and improves its influence.

A similar effect is obtained even if the light amount is concentrated in the second-order diffracted light beam D2 and the first-order diffracted light beam T1 of the opposite angle direction which are sufficiently separated with respect to the zeroth-order diffracted light beam D0 which is the reference light beam component. In this case, the light amount of the average value or greater of all of the beam components which enter the screen 806 is preferably given to the light beam which is sufficiently separated with respect to the reference light beam component.

Furthermore, the preferred light amount distribution of the diffracted light beams can be acquired by optimizing the curvature radius of the microlens array 810. In the present embodiment, the light amount is concentrated in the light beam component which sufficiently separates with respect to the reference light beam component by using a microlens array 810 configured by a microlens with a curvature radius of 46 μm at a 20 μm pitch. Specifically, as previously mentioned, the ratio of the light amount per one diffracted light beam increases to 6.1% for the second-order diffracted light beam D2, and increases to 6.7% for the first-order diffracted light beam T1 of the opposite angle direction, which are higher than the average value of 5.3% of all the beam components entering the screen 806.

As in the present embodiment, when a diffractive grating is used as a light beam component generator, the diffraction efficiency becomes a problem. As in the present embodiment, when 19 diffracted light beams up until the second-order diffracted light beam are used, the total diffraction efficiency increases compared to the case in which seven diffracted light beams up until the first-order diffracted light beam are used, and the light amount loss for the light beam from the light source can be reduced.

Furthermore, in the present embodiment, 19 diffracted light beams up until the second-order diffracted light beam were used, however if diffracted light beams with a higher order such as fourth, sixth, eighth, and tenth-order diffracted light beams are used, a further speckle reduction effect can be acquired.

[Embodiment 4]

Figure 11A:
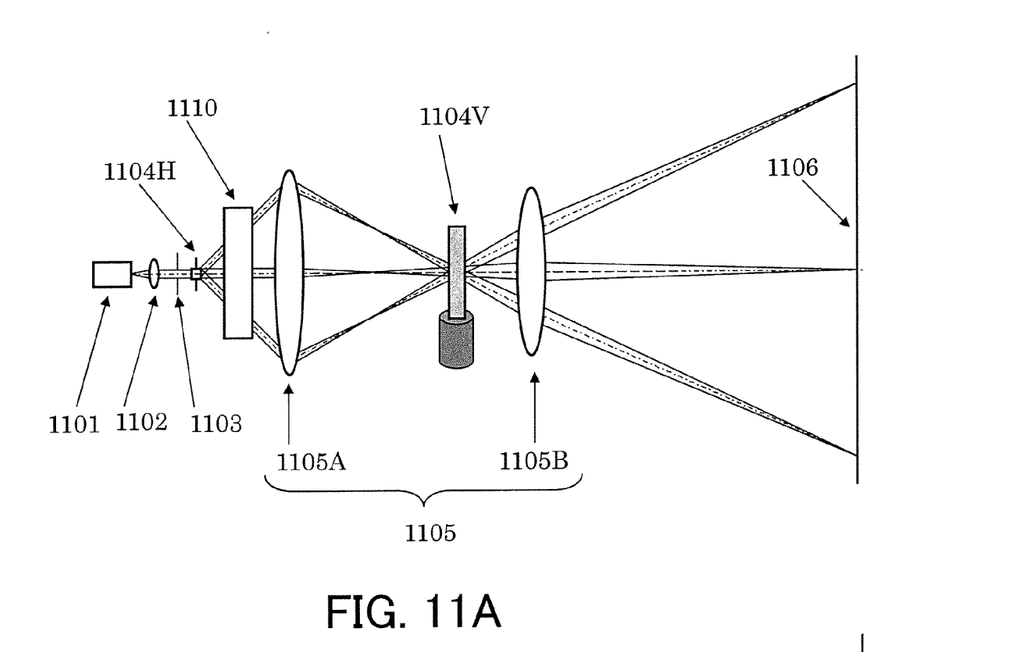
FIG. 11A is a horizontal cross-sectional view of the light scanning apparatus and the scanning display apparatus which are embodiment 4 of the present invention.
Figure 11B:
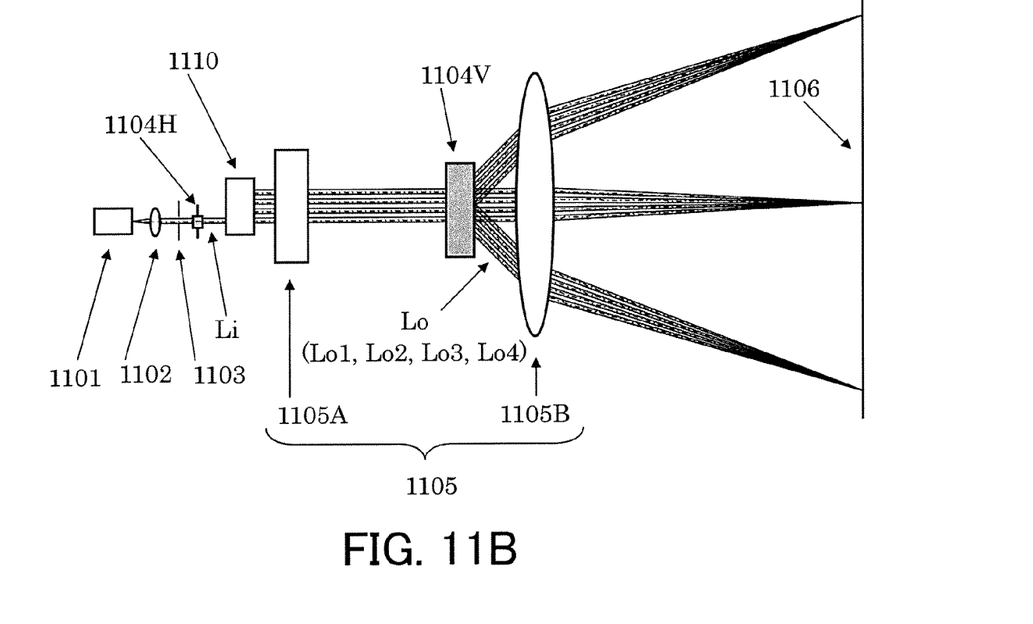
FIG. 11B is a vertical cross-sectional view of the light scanning apparatus and the scanning display apparatus which are embodiment 4 of the present invention.

FIG. 11A and FIG. 11B show a horizontal cross-sectional view and a vertical cross sectional view of the light scanning apparatus (and scanning display apparatus) which are embodiment 4 of the present invention, respectively.

A light source 1101 of the present embodiment is, for example, a red semiconductor laser. The coherent laser light beam emitted from the light source 1101 is converted into collimated light beam by a collimator lens 1102, and the width of the light beam is limited by an aperture stop 1103 and then it enters a horizontal scanning device 1104H. The horizontal scanning device 1104H is an MEMS mirror device like that of embodiment 1, and deflects (scans) the light beam from the light source 1101 in a horizontal direction.

The light beam deflected by the horizontal scanning device 1104H proceeds to the conjugate point of the horizontal scanning device 1104H which is formed by a scanning lens 1105A which is part of an image-forming optical system 1105. Then, it is deflected (scanned) in the vertical direction by the vertical scanning device 1104V positioned in the conjugate point or the vicinity thereof. The light beam scanned in this way is imaged on a screen 1106 as a spot by a projection lens 1105B. Thereby, a two-dimensional image is projected (displayed or formed) on the screen 1106.

In the present embodiment, a light beam component generator 1110 generating a plurality of light beam components separating from each other in a vertical direction is positioned between the horizontal scanning device 1104H and the scanning lens 1105A.

Figure 12:
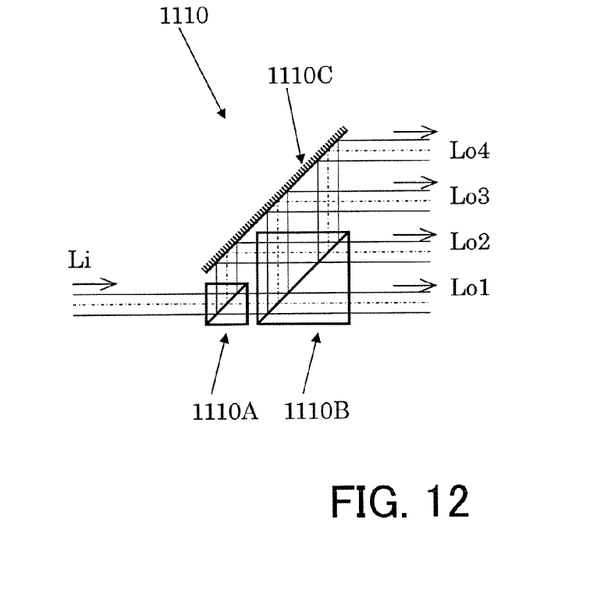
FIG. 12 is a vertical cross-sectional view of a light beam component generator used in embodiment 4.

FIG. 12 shows a vertical cross-sectional view of the light beam component generator 1110. The light beam component generator 1110 is configured using the first and second half prisms 1110A and 1110B and a mirror 1110C. The light beam component generator 1110 generates four light beam components Lo1, Lo2, Lo3, and Lo4 which separate from each other in the vertical direction from the light beam Li which has entered.

The entering light Li enters the first half prism 1110A, and is divided into a transmitted light beam and a reflected light beam. The light beam penetrating the first half prism 1110A enters the second half prism 1110B, and it is divided here into a transmitted light beam and a reflected light beam.

The light beam penetrating the second half prism 1110B becomes the first emitted light beam component Lo1. The light beam which reflects in the second half prism 1110B is reflected in the mirror 1110C and becomes the third emitted light beam component Lo3 which is parallel with respect to the first emitted light beam Lo1.

Meanwhile, the light beam which reflects in the first half prism 1110A is reflected by the mirror 1110C and enters the second half prism 1110B, and it is divided here into a transmitted light beam and a reflected light beam. The transmitted light beam of those becomes the second emitted light beam component Lo2, and the reflected light beam is reflected by the mirror 1110C and becomes the fourth emitted light beam component Lo4.

In this manner, the light beam component generator 1110 of the present embodiment generates the light beam components Lo (Lo1, Lo2, Lo3, and Lo4), which are separated from each other in the vertical direction and are parallel to each other (including cases in which there is some deviation, but not enough to be considered unparallel), from one light beam Li which has entered.

As shown in FIG. 11B, in the vertical cross-sectional view of the light scanning apparatus, four separated light beam components Lo (Lo1, Lo2, Lo3, and Lo4) are generated by the light beam component generator 1110 from the light beam Li deflected by the horizontal scanning device 1104H. These light beam components Lo (Lo1, Lo2, Lo3, and Lo4) enter the vertical scanning device 1104V through the scanning lens 1105A.

The four light beam components Lo1, Lo2, Lo3, and Lo4 which were deflected in the vertical scanning device 1104V, are collected to one point on the screen 1106 by a projection lens 1105B. In other words, they are superposed in identical positions on the screen 1106. The four light beam components Lo1, Lo2, Lo3, and Lo4, proceed to the screen 1106 (with a separation angle) while remaining separated from each other, and enter identical positions on the screen 1106.

In this manner, when the plurality of light beam components which are separated are collected to one point on the screen 1106, the speckle patterns generated by the light beam components become speckle patterns with almost no correlation to each other. Speckle contrast can largely be reduced in comparison to when an image is displayed by scanning one light beam by superposing this plurality of speckle patterns with almost no correlation.

In the case of present embodiment, the light beam component entered at one point on the screen 1106 is N=4. Therefore, the speckle contrast can be reduced by ½.

As explained above, in each of the aforementioned embodiments, a plurality of light beam components which are separated from each other are generated based on one light beam from a light source, then collected and sent to a screen, and are then superposed at one point (identical position) on the screen. Thereby, a plurality of speckle patterns with almost no or very little correlation to each other can be generated simultaneously, and speckle contrast can be reduced by superposing them. Moreover, a high resolution can be secured.

Furthermore, the present invention is not limited to these embodiments and various variations and modifications may be made without departing from the scope of the present invention.

For example, in the above embodiments, cases using a microlens array (diffractive grating) or a half prism (half mirror) to generate a plurality of light beam components which were separated from each other was explained. However, other light beam component generators may be used such as a hologram, the combination of a plurality of polarized beam splitters and mirrors, and the like.

This application claims the benefit of Japanese Patent Application No. 2007-187113, filed on Jul. 18, 2007, which is hereby incorporated by reference herein in its entirety.

What is claimed is:

1. A light scanning apparatus comprising:
a light source that emits a modulated coherent light beam;
a scanner configured to scan the modulated coherent light beam from a light source;
a light beam component generator configured to divide the modulated coherent light beam outgoing from the scanner into a plurality of light beam components, the plurality of light beam components each having a peak in light amount; and
an optical system configured to converge each of the plurality of light beam components so that the plurality of converged light beam components impinge on a scan surface at incident angles different from each other, and configured to superpose the plurality of converged light beam components at an identical position on the scan surface;
wherein, when Napier's number is represented as e, and a part where a light amount is $1/e^2$ or more of the peak in each of the light beam components is defined as an effective light flux part, the plurality of light beam components include a plurality of separated light beam components which separate from a certain effective light flux part, and a plurality of overlapping light beam components which overlap the certain effective light flux part.

2. The light scanning apparatus according to claim 1,
wherein the light beam component generator is configured to divide the modulated coherent light beam into the plurality of light beam components and another light beam component which are led to the scan surface by the optical system, and
wherein at least half of light beam components among the plurality of light beam components have light amounts more than an average light amount of the plurality of light beam components and the other light beam component.

TABLE 1

| | | OPTICAL SYSTEM CONFIGURATION | | | | | |
|---|---|---|---|---|---|---|---|
| OPTICAL ELEMENT | | SURFACE | CURVATURE RADIUS | X COORDINATE | Y COORDINATE | Z COORDINATE | GLASS MATERIAL | Nd, Vd |
| HORIZONTAL SCANNING DEVICE 104H | | REFLECTING SURFACE | PLANE | 0.00 | 0.00 | 0.00 | | |
| SCANNING OPTICAL SYSTEM 105A | LENS 105Aa | INCIDENT SURFACE | 43.19737 | 0.00 | 0.00 | 29.65 | SLAH66_OHARA | 1.77250 49.6 |
| | | EMITTING SURFACE | −20.96015 | 0.00 | 0.00 | 36.65 | | |
| | LENS 105Ab | INCIDENT SURFACE | −18.93969 | 0.00 | 0.00 | 37.53 | STIH53_OHARA | 1.84666 23.8 |
| | | EMITTING SURFACE | −45.36840 | 0.00 | 0.00 | 40.53 | | |
| MICROLENS ARRAY 110 | | INCIDENT SURFACE | PLANE | 0.00 | 0.00 | 70.51 | | |
| | | EMITTING SURFACE | PLANE | 0.00 | 0.00 | 71.51 | | |
| PROJECTION OPTICAL SYSTEM 105B | LENS 105Ba | INCIDENT SURFACE | PLANE | 0.00 | 0.00 | 102.27 | SLAL14_OHARA | 1.69680 55.5 |
| | | EMITTING SURFACE | −35.49839 | 0.00 | 0.00 | 112.27 | | |
| | LENS 105Bb | INCIDENT SURFACE | −19.99019 | 0.00 | 0.00 | 129.65 | STIM35_OHARA | 1.69895 30.1 |
| | | EMITTING SURFACE | 124.75869 | 0.00 | 0.00 | 135.65 | | |
| | LENS 105Bc | INCIDENT SURFACE | 146.67322 | 0.00 | 0.00 | 135.75 | SLAH66_OHARA | 1.77250 49.6 |
| | | EMITTING SURFACE | −28.77581 | 0.00 | 0.00 | 145.75 | | |
| LAPEL MIRROR | | REFLECTING SURFACE | PLANE | 0.00 | 0.00 | 165.75 | | |
| VERTICAL SCANNING DEVICE 104V | | REFLECTING SURFACE | PLANE | 0.00 | 20.00 | 165.75 | | |
| PROJECTION OPTICAL SYSTEM 105B | LENS 105Bd | INCIDENT SURFACE | 45.98808 | 0.00 | 20.00 | 195.75 | LAH55_OHARA | 1.83481 42.7 |
| | | EMITTING SURFACE | −80.29546 | 0.00 | 20.00 | 210.75 | | |
| | LENS 105Be | INCIDENT SURFACE | −57.56963 | 0.00 | 20.00 | 211.46 | STIM5_OHARA | 1.60342 38.0 |
| | | EMITTING SURFACE | 34.35574 | 0.00 | 20.00 | 216.46 | | |
| SCREEN 106 | | | | 0.00 | 20.00 | 765.75 | | |

3. The light scanning apparatus according to claim 1,
wherein the light beam component generator is configured to divide the modulated coherent light beam into the plurality of light beam components and another light beam component which are led to the scan surface by the optical system, and
wherein the sum of the light amount of the plurality of light beam components is at least half of the sum of the light amount of the plurality of light beam components and the other light beam component.

4. The light scanning apparatus according to claim 1, wherein the light beam component generator has a diffractive grating, and
wherein the plurality of light beam components are diffractive light beam components of a portion of diffraction orders among diffracted light beam components of a plurality of diffraction orders generated at the diffractive grating.

5. The light scanning apparatus according to claim 1, wherein the following condition is satisfied:

$$\theta d \geqq 0.045 \text{ deg}$$

where $\theta d$ is a separation angle of the plurality of light beam components when the plurality of light beam components proceed to the scan surface.

6. The light scanning apparatus according to claim 1, wherein the following condition is satisfied:

$$\theta d \geqq 0.076 \text{ deg}$$

where $\theta d$ is a separation angle of the plurality of light beam components when the plurality of light beam components proceed to the scan surface.

7. A scanning display apparatus comprising:
a light scanning apparatus according to claim 1,
wherein the scanning display apparatus forms an image on a scan surface using the light scanning apparatus.

8. The light scanning apparatus according to claim 1, wherein the light beam component generator is a diffractive grating,
wherein light beam components being half or more of the plurality of separated light beam components have a light amount larger than an average of light amounts of a first-order diffractive light and a second-order diffractive light which are caused by the diffractive grating.

9. The light scanning apparatus according to claim 1, wherein light beam components being half or more of the plurality of separated light beam components have a light amount larger than an average of the light amount of the plurality of light beam components which are caused by the light beam component generator.

\* \* \* \* \*